United States Patent Office 3,265,748
Patented August 9, 1966

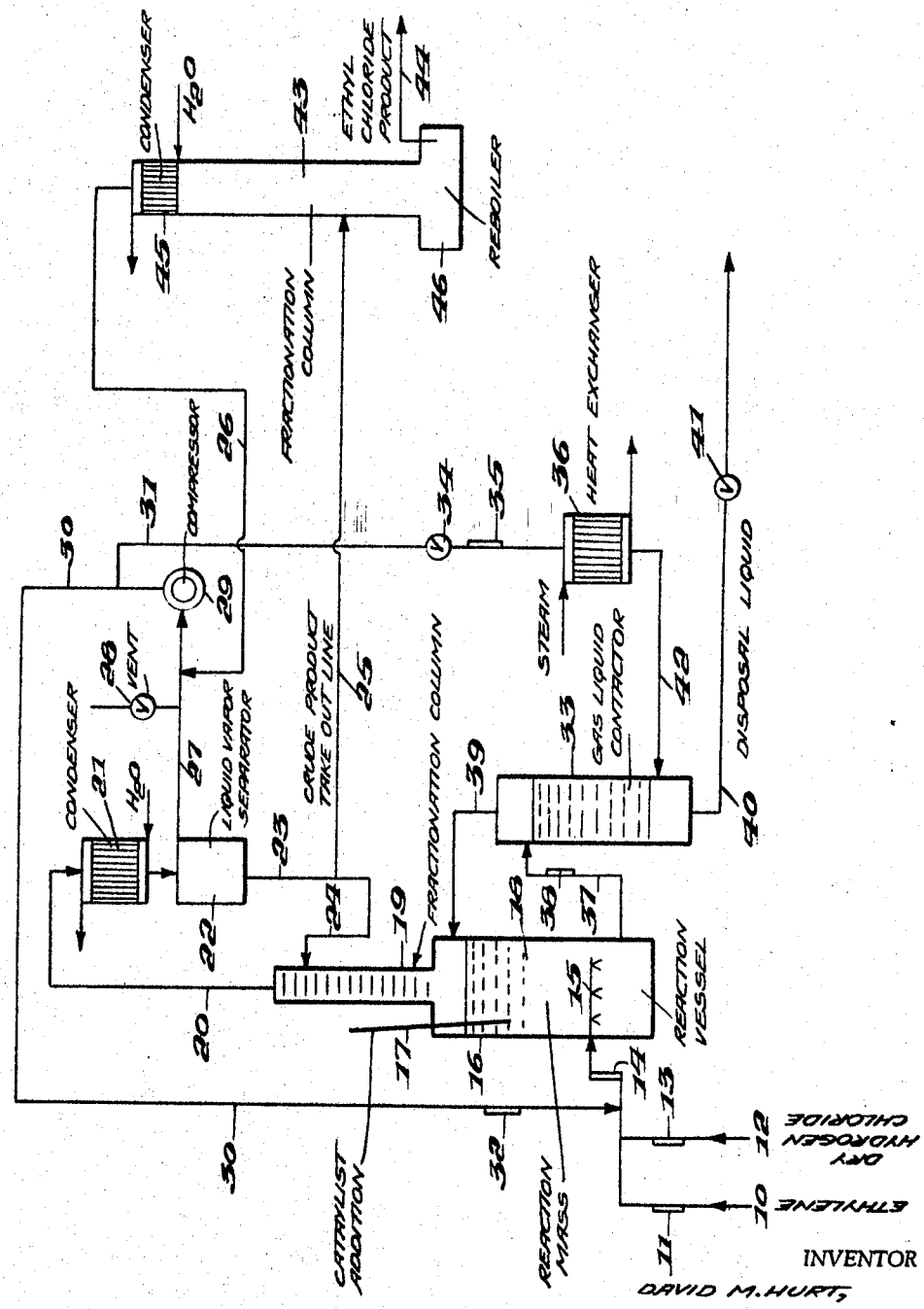

3,265,748
PROCESS FOR THE MANUFACTURE OF ETHYL CHLORIDE
David M. Hurt, Wilmington, Del., assignor to E. I. du Pont de Nemours and Company, Wilmington, Del., a corporation of Delaware
Filed June 26, 1963, Ser. No. 290,799
3 Claims. (Cl. 260—663)

This invention is directed to an improved process for the manufacture of ethyl chloride. More particularly, this invention is directed to an improved process for the manufacture of ethyl chloride wherein provision is made for removing catalyst poisons from the reaction system.

It has been known that ethylene will react with hydrogen chloride in a liquid reaction medium in the presence of Friedel-Crafts type catalysts such as anhydrous ferric chloride, aluminum chloride or zinc chloride. It is also known that these catalysts cause polymerization of the ethylene in the reaction mass to higher molecular weight materials and that these higher molecular weight materails act as catalyst poisons causing the catalyst to lose its activity. Higher olefins such as isobutylene are much more prone to polymerize than ethylene. It is further known that ferric chloride causes less ethylene polymerization than the aluminum chloride or zinc chloride catalysts.

The usual method for overcoming the difficulty of the catalyst poisoning caused by the polymerization of ethylene has been to add fresh catalyst to the reaction medium. Occasionally, spent catalyst was also withdrawn from the reaction medium and disposed of in some manner. In a continually operating system for the preparation of ethyl chloride, however, these polymeric catalyst poisons build up in the liquid reaction medium to an extent where even the addition of fresh catalyst to the system will not give the catalytic activity necessary to give continuous high conversions of ethylene and hydrogen chloride to ethyl chloride.

It is, therefore, an object of this invention to provide an improved process for preparing ethyl chloride from ethylene and hydrogen chloride.

It is another object of this invention to provide an improved process for preparing ethyl chloride from ethylene and hydrogen chloride which overcomes the problem of catalyst poisoning inherent in the art processes.

It is a further object to provide an improved process for preparing ethyl chloride from ethylene and hydrogen chloride which operates in a continuous manner at high conversion.

These and other objects will become apparent from the following description and claims.

More specifically, the present invention is directed to a novel, improved process for the preparation of ethyl chloride which comprises contacting hydrogen chloride and ethylene with anhydrous ferric chloride catalyst in a reaction medium containing ethyl chloride as the major constituent, adding fresh catalyst to the reaction zone as required, continuously removing a portion of said liquid ethyl chloride reaction medium from the reaction zone, contacting said portion of the reaction medium with a superheated mixture of ethylene, hydrogen chloride and ethyl chloride vapors recycled from the reaction zone in a gas-liquid contactor, therein allowing ethyl chloride and from 0.1 mole to 20 moles per 100 moles of ethyl chloride, of other constitutents having boiling points less than 150° C. to vaporize at one atmosphere from said liquid portion, collecting said vaporized materials of said portion of the reaction medium and returning the vaporized materials to said reaction zone and removing the unvaporized constituents of said portion from said gas-liquid contactor.

The art process on which the present invention is an improvement consists in causing hydrogen chloride to react with ethylene in the presence of anhydrous ferric chloride suspended and dissolved in liquid ethyl chloride which may contain varying amounts of higher molecular weight organic compounds. It is known that liquid ethyl chloride can be used as the reaction medium in this process although higher boiling halogenated aliphatic hydrocarbons are usually preferred in the art process. In a convenient form and the form usually used, the reaction is carried out in a reaction zone consisting of a reaction vessel, a fractionation or rectification column and a reflux condenser. Gaseous ethylene and hydrogen chloride are passed into the liquid medium containing the suspended catalyst. A vapor mixture of ethyl chloride, hydrogen chloride, ethylene and by-products passes into the fractionation column and condenser. Some of the ethyl chloride and all of the by-products are condensed in contact with the descending ethyl chloride reflux and returned to the reaction zone. Most of the unreacted ethylene and hydrogen chloride are not condensed but are removed from the condenser system along with small amounts of ethyl chloride and returned to the reaction zone as an external recycle. Product ethyl chloride is removed from the condenser system as a liquid. Sufficient ethyl chloride is returned to the reaction zone to maintain proper descending reflux in the column and to maintain the liquid level in the reaction zone at the desired level.

As the reaction continues, the polymeric by-products which form collect in the liquid reaction medium and poison the catalyst. Since these polymerization products are relatively non-volatile compared to the ethyl chloride reaction medium, they cannot be removed by vaporization. Conversion of ethylene and hydrogen chloride to ethyl chloride decreases rapidly with time due to catalyst poisoning. Addition of fresh catalyst, as taught by the art, partially overcomes this problem but this soon fails too since the amount of catalyst poison soon builds up to a point where catalyst is deactivated as soon as it is added.

It has now been found that the polymerization by-products vary from relatively low boiling materials having boiling points of about 56° to very high boiling materials having boiling points greater than 225° C. Non-distillable tars also occur. In a qualitative way it has been found that these by-products having boiling points below 150° C. at one atmosphere are relatively inocuous catalyst poisons. Those having boiling points above 150° C. and particularly those boiling above 170° C. are very severe ferric chloride catalyst poisons however. This was demonstrated by fractionally distilling a sample of the polymeric by-product, then agitating one part of each fraction with five parts of the ferric chloride catalyst and 110 parts of ethyl chloride for two hours. The solid iron compounds were then isolated and analyzed for ferrous chloride. Those samples of iron compounds treated with by-products having boiling points less than 150° C. contained about 11% ferrous chloride, whereas those treated with by-products having boiling points between 150° and 170° C. contained about 13% ferrous chloride while those treated with by-products boiling above 170° C. contained from 21% to 35% ferrous chloride. This also shows that catalyst deactivation or poisoning is due, in part at least, to reduction of ferric chloride to ferrous chloride. Physical adsorption of high molecular weight materials on the catalyst surface also accounts for some of the catalyst poisoning. Judging from those by-products identified, they seem to consist of four types of compounds; i.e., alkanes such as 3- methyloctane, olefines such as dimethylhexene and trimethylpentene, chloroalkanes such as 2-chlorobutane and chlorinated olefines such as chloropentene and chloroheptene. This list is far from complete, since it is known that at least 29 different by-products are formed.

It has been further found that as little as 1% of the ethylene polymerization by-products in the ethyl chloride reaction mass having boiling points of 170° C. and above cause severe deactivation of the ferric chloride catalyst. It has also been found that of the four types of by-products formed as mentioned heretofore, the olefines are the worst catalyst poisons. The chlorinated alkanes are relatively harmless as might be expected since they are used as solvents for this process in some cases. It has also been found that polymerization increases markedly as the catalyst becomes deactivated.

The present process overcomes the problem of catalyst poisoning and diminished conversions due to polymerization by-products by continuously removing these by-products from the reaction mass. This is accomplished by continuously removing a stream of the liquid ethyl chloride reaction mass from the reaction zone and treating this stream in a gas-liquid contactor with a mixture of superheated ethylene, hydrogen chloride and ethyl chloride vapors recycled from the reaction zone. The superheated vapors contact the stream of liquid ethylene chloride reaction mass at a temperature sufficient to cause ethyl chloride and a portion of the by-products to vaporize from the reaction mass. The vaporized material, which of course includes the ethylene, hydrogen chloride and ethyl chloride injected as superheated vapors, is returned to the reaction zone, most conveniently by injecting it into the reaction vessel or fractionation column. The non-vaporized portion of the stream, containing the high boiling constituents which act as catalyst poisons, is removed for disposal such as burning. This portion contains any ferric chloride catalyst which was dissolved or suspended in the original reaction mass stream. For this reason it is necessary to continuously add fresh ferric chloride catalyst to the reaction mass to replace that removed. Using this method of operation, it has been found that it is possible to carry out the reaction of ethylene with hydrogen chloride in a continuous manner in high conversion and yield essentially without interruption.

The present invention will be better understood by reference to the accompanying drawing which illustrates a representative and preferred embodiment of the improved process of this invention. In the drawing, the reaction system shown consists of an ethylene source 10, an ethylene flow meter 11 for measuring and controlling the ethylene flow, a hydrogen chloride source 12, a hydrogen chloride flow meter 13 for measuring and controlling the flow of hydrogen chloride, a feed flow meter 14 for measuring and controlling the flow of the mixed gases, a feed inlet 15 and catalyst addition line 17 which feed directly into the liquid ethyl chloride-ferric chloride reaction mass 18 which is contained in the reaction vessel 16. Attached to reaction vessel 16 and forming a part thereof is fractionation column 19 which, in turn, communicates with vapor line 20, condenser 21, liquid-vapor separator 22, liquid return line 23, liquid reflux return line 24, and a crude product take-off line 25. The crude product take-off line 25 communicates with a fractionation column 43, reboiler 46, an ethyl chloride product line 44, reflux condenser 45, and a vapor return line 26. From the top of separator 22, vapor line 27 leads to vent valve 28, compressor 29, recycle line 30, recycle vapor flow meter 32, and vapor take-off line 31. Vapor take-off line 31 leads to the bottom of gas-liquid contactor 33 via control valve 34, flow meter 35 and heat exchanger 36. Line 37, containing a flow meter 38, connects the bottom of reaction vessel 16 with the top of gas-liquid contactor 33. Vapor line 39 connects the top of gas-liquid contactor 33 with the reaction vessel 16. Liquid line 40 and valve 41 are connected to the bottom of contactor 33. Line 42 connects the outflow of the heat exchanger with the gas-liquid contactor 33.

In operation, recycle vapors from line 30, consisting mainly of hydrogen chloride with smaller amounts of ethylene and ethyl chloride, are measured by flow meter 32. This mixture is then combined with approximately equivalent amounts of ethylene and hydrogen chloride feed from sources 10 and 12, measured and controlled by meters 11 and 13, and the resulting mixture, at the desired flow rates, as measured by meter 14, enters reaction vessel 16 via inlet 15. The reaction vessel 16 contains a reaction medium 18 consisting of a suspension and/or solution of anhydrous ferric chloride in ethyl chloride. Ethylene and hydrogen chloride react, in part, in reaction medium 18 to form ethyl chloride and by-products. Unreacted ethylene and hydrogen chloride carry ethyl chloride and by-products into the fractionation column 19 where fractionation occurs in contact with descending liquid reflux from line 24 which condense the by-products and return them to the reaction vessel 16. Vapors from the top of 19 pass into vapor line 20, hence into condenser 21. In condenser 21 most of the ethyl chloride is condensed and descends into the vapor-liquid separator 22 along with the uncondensed materials. The separated liquid condensate is returned to the fractionation column 19 via lines 23 and 24. Sufficient liquid is returned to the fractionation column 19 to maintain proper descending reflux for fractionation in the column 19 and to maintain the proper liquid level in the reactor. The remaining liquid, being crude ethyl chloride, is removed via line 25 to a fractionation column 43 wherein pure ethyl chloride is obtained and drawn off the column from the reboiler 46 via product line 44. Any dissolved hydrogen chloride and ethylene in the crude ethyl chloride are collected in the reflux condenser 45 and returned to the reaction system via line 26. The uncondensed vapors from the separator 22 pass into line 27, drawn by the compressor 29. Valve 28 is merely used to vent-off excessive pressure in the system. The compressor 29 acts to provide sufficient pressure to cause the vapors to flow. A portion of the vapors leaving compressor 29 pass via recycle line 30 and measuring means 32 into the reaction vessel 16 as heretofore described. The other portion of the vapors leaving compressor 29 pass via line 31, control valve 34 and flow meter 35 into heat exchanger 36 where the vapors are superheated considerably above their dew point. The superheated vapors then pass via line 42 into the bottom of the gas-liquid contactor 33. Part of the liquid ethyl chloride reaction mass 18 is passed via line 37 and control meter 38 into the top of gas-liquid contactor 33. Contact of the superheated vapors from line 42 with the liquid from line 37 causes a portion of the liquid to vaporize as indicated hereinbefore. These vapors pass via line 39 into reaction vessel 16 for return to the reaction mass. The unvaporized portion passes from the gas-liquid contactor 33 via line 40 and valve 41 to waste. Usually the waste is burned. Concurrently with the above, fresh catalyst is added to reactor 16 via catalyst feed line 17 in sufficient quantity to replace that removed via line 37.

The above described method does not depend on any particular size system or reaction mass. The reaction system is designed, of course, to meet the requirements of the size of reaction mass or production rate contemplated. The reaction temperatures and pressures used in this invention are those disclosed and used in the art. Flow rates are chosen to give the desired reaction mass and to fit the size of the reaction equipment. The rate of removal of reaction mass to the gas-liquid contactor 33 is somewhat variable, usually from about 0.1% to 10% of the reaction mass is transferred to the gas-liquid contactor 33 each hour. The temperature of the superheated vapors depends primarily on the reaction pressure. In a representative commercial scale operation, reaction vessel 16 was a 13,610 gallon pressure vessel and the fractionation column 19 was a 5 ft. x 17 ft. column filled with 15 sieve trays. The reaction vessel contained at start-up approximately 25,000 lbs. of ethyl chloride reaction solvent containing 1% ferric chloride catalyst. The reaction temperature was varied from 25° to 70° C. with corresponding variations in reaction pressure of from 160 to 200 p.s.i.g. The reaction temperature of 65° C. and the reaction pressure of 185 p.s.i.g. are usually preferred.

The feed stock enters the reactor 16 via inlet 15, consisting of 15 to 25 mole percent of each of ethylene and ethyl chloride and the remainder hydrogen chloride, at rates varying from 28,000 to 132,000 lbs./hr. The feed stock was made from the recycle vapors from line 30 and additional ethylene and hydrogen chloride to make up the desired rate. The added ethylene and hydrogen chloride feed, entering via lines 10 and 12 and consisting of approximately equivalent amounts of the two reactants, varied from 4600 to 14,000 lbs./hr. The preferred total feed rate, measured at flow meter 14, is 120,000 lbs./hr. The recycle vapors flow rate varied from 300 to 1400 cubic feet per minute (26,000 to 122,000 lbs./hr.) with 1200 cubic feet per minute (106,000 lbs./hr.) being the preferred recycle vapor flow rate. The recycle vapors contained from 55% to 83% hydrogen chloride, 2% to 20% ethylene and 15% to 25% ethyl chloride. The preferred make-up of the recycle vapors being 75% hydrogen chloride, 5% ethylene and 20% ethyl chloride.

During the reaction from 1000 to 2500 lbs./hr. of the reaction mixture, at 25° to 75° C., were removed from the reaction mixture and were passed into the gas-liquid contactor 33 with 2000 lbs./hr. corresponding to the preferred rate of removal. The gas-liquid contactor 33 was a 20 inch x 7 ft. 4 inch sieve tray contactor of 132 gallon capacity. Concurrently, from 25 to 150 cubic feet per minute of vapors in line 31, heated to from 50° to 140° C. with steam in heat exchanger 36, were passed into the gas-liquid contactor 33. The flow and temperature of heated vapors were adjusted to meet the requirements of the flow of liquid, the temperature and the pressure. A flow of 149 cubic feet per minute at 140° C. corresponds to the preferred flow rate for the superheated vapors. The flow of vaporized material from the gas-liquid contactor 33 through line 39 to the reactor 16 varied from 25 to 100 cubic feet per minute at from 45° to 65° C. The vaporized material from the gas-liquid contactor which is returned to the reaction vessel 16 via line 39 consists of ethyl chloride, ethylene and hydrogen chloride containing up to 0.2 weight percent of by-products having boiling points up to 150° C. This flow is, of course, directly dependent on the flow of liquid and superheated vapors into the gas-liquid contactor 33. A flow of 95 cubic feet per minute at 60° C. corresponds to the preferred rate of flow for the vaporized materials from the gas-liquid contactor 33 back to the reaction vessel 16. The flow of unvaporized material from the gas-liquid contactor 33 via line 40 is again dependent on the flow of materials into the contactor 33. It varied from 300 to 1200 lbs./hr. with 400 lbs./hr. corresponding to the preferred flow rate. These results indicate that 30% to 48% by weight of the liquid entering contactor 33 remains unvaporized and represents by-products and catalyst. Under the preferred conditions 16% remains unvaporized; this amounts to 1.6% of the total reaction mass per hour.

The yield of pure ethyl chloride, obtained from line 44 was from 4200 to 13,900 lbs./hr. with 13,900 lbs./hr. corresponding to the preferred rate of recovery. The conversion of hydrogen chloride varied from 90% to 100% and the conversion of ethylene from 90% to 100%. The yield of ethyl chloride varied from 90% to 99.6% with 99.6% corresponding to the preferred yield of ethyl chloride.

When the same process was carried out as hereinbefore described without passing any liquid reaction mass through contactor 33 along with heated vapors from line 31, originally high conversions (100%) were obtained but these rapidly decreased. After only 16 hours the conversion had decreased to 75% and in 48 hours the catalyst was essentially dead. Additions of fresh catalyst prolonged the running time but after 60 hours even fresh catalyst had little or no effect on conversion. Thus, after 60 hours and 133,000 lbs. of production, it was necessary to shut down the reaction system and remove the entire reaction mass. With the method of this invention the system was operated for greater than one month continuously (>720 hours) without a shutdown due to catalyst poisoning and produced greater than 5,000,000 lbs. of ethyl chloride, without any sign that a shutdown would be required.

It is to be understood that the preceding preferred embodiment is representative and that said embodiment may be varied within the teachings and disclosure of the total specification, as understood by one skilled in the art, to produce essentially the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process for preparing ethyl chloride comprising contacting hydrogen chloride and ethylene at a temperature from 25° C. to 75° C. in a reaction zone in the presence of anhydrous ferric chloride catalyst contained in a reaction medium, said reaction medium containing ethyl chloride as the major constituent, and wherein the vaporous effluent from the reaction zone is condensed into a separator where the liquid is separated from the effluent vapors, a portion of the separated liquid thereafter being distilled to obtain the product ethyl chloride, the improvement which comprises continuously removing a portion of said liquid ethyl chloride reaction medium from said reaction zone, contacting said removed liquid portion with superheated vapors recycled from the reaction zone thereby vaporizing the ethyl chloride and from 0.1 mole to 20 moles, per 100 moles of ethyl chloride, of other constituents having boiling points less than 150° C. at one atmosphere from said removed liquid portion, collecting and returning only said vaporized materials of said liquid portion to said reaction zone, and replenishing the catalyst as required by adding fresh catalyst to the reaction medium.

2. In the process for preparing ethyl chloride comprising contacting hydrogen chloride and ethylene at a temperature from 25° C. to 75° C. in a reaction zone in the presence of anhydrous ferric chloride catalyst contained in a reaction medium, said reaction medium containing ethyl chloride as the major constituent, and wherein the vaporous effluent from the reaction zone is condensed into a separator where the liquid is separated from the effluent vapors, a portion of the separated liquid thereafter being distilled to obtain the produce ethyl chloride, the improvement which comprises continuously removing a portion of said liquid ethyl chloride reaction medium from said reaction zone, contacting said removed liquid portion with a superheated mixture of effluent vapors comprising ethylene, hydrogen chloride, and ethyl chloride from said separator thereby vaporizing the ethyl chloride and from 0.1 mole to 20 moles, per 100 moles of ethyl chloride, of other constituents having boiling points less than 150° C. at one atmosphere from said removed liquid portion, collecting and returning only said vaporized materials of said liquid portion to said reaction zone, and replenishing the catalyst as required by adding fresh catalyst to the reaction medium.

3. In the process for preparing ethyl chloride comprising contacting hydrogen chloride and ethylene at a temperature from 25° C. to 75° C. in a reaction zone in the presence of anhydrous ferric chloride catalyst contained in a reaction medium, said reaction medium containing ethyl chloride as a major constituent, and wherein the vaporous effluent from the reaction zone is condensed into a separator where liquid is separated from the effluent vapors, a portion of the separated liquid thereafter being distilled to obtain the product ethyl chloride, the improvement which comprises continuously removing a portion of said liquid ethyl chloride reaction medium from said reaction zone, contacting said removed liquid portion with a superheated mixture of effluent vapors comprising ethylene, hydrogen chloride, and ethyl chloride from said separator, thereby vaporizing the ethyl chloride and from 0.1 mole to 20 moles, per 100 moles of ethyl chloride, of other substituents having boiling points less than 150° C. at one atmosphere from said removed liquid portion, collecting and returning only said vaporized materials of said liquid portion to said reaction zone, disposing of the unvaporized constituents of said liquid portion, and replenishing the catalyst as required by adding fresh catalyst to the reaction medium.

References Cited by the Examiner

UNITED STATES PATENTS

| | | | |
|---|---|---|---|
| 2,140,927 | 12/1938 | Pierce | 260—663 |
| 2,225,933 | 12/1940 | Slotterbeck | 260—663 |
| 2,353,563 | 7/1944 | Hemminger | 260—663 |
| 2,392,454 | 1/1946 | Bond et al. | 260—663 |
| 2,434,093 | 1/1948 | Axe | 260—663 |
| 2,446,124 | 7/1948 | Boyd | 260—663 |
| 2,945,897 | 7/1960 | Eisenlohr | 260—663 |

LEON ZITVER, *Primary Examiner.*

K. V. ROCKEY, *Assistant Examiner.*